Patented Jan. 6, 1931

1,787,542

UNITED STATES PATENT OFFICE

GEORGE W. MILES, OF BOSTON, MASSACHUSETTS, AND CAMILLE DREYFUS, OF NEW YORK, N. Y., ASSIGNORS TO CELANESE CORPORATION OF AMERICA, A CORPORATION OF DELAWARE

PHOSPHORIC-ACID SOLUTION OF CELLULOSE

No Drawing.   Application filed December 30, 1925.   Serial No. 78,477.

As is well known, cellulose is a very inert substance chemically speaking, and enters into combination with other substances with considerable difficulty. It is also soluble only with difficulty and in many cases the solutions which are formed readily break down into their separate constituents or else the cellulose itself is depolymerized or otherwise transformed into undesirable compounds.

We have found that by appropriate treatment of cellulose with phosphoric acid either alone or with subsequent treatment with certain other substances, a bright, clear, and transparent solution may be obtained which lends itself to a large number of uses.

The strength of the phosphoric acid solution may vary considerably but should preferably be from 75 or 85 to 100% in order to obtain the most advantageous results. The temperature at which the solution is formed may also vary from below freezing to as high as 70° F. without any appreciably objectionable results. Ordinary room temperature or somewhat below, say from 30° to 50° F., is more advantageous than higher temperatures.

The solution may be formed by treatment with phosphoric acid alone or there may be added either simultaneously or later other reagents which facilitate the production of a thoroughly satisfactory solution. Glacial acetic acid or its homologues, such as butyric acid, propionic acid and other of these series may be employed. It is also found that ethyl alcohol or the higher or lower homologues or series of alcohols may be employed. These substances may be employed in amounts equal to 30 to 50% in volume of the reacting mixture.

As specific illustration the following may be given.

Although experiments have been made generally with linters, it is to be understood that cellulose in other forms may be used instead. In one case 5 grams of linters was mixed with 100 cc. of phosphoric acid of 85 to 88% strength and allowed to stand at about freezing temperature for several hours. There was then added thereto one-third the volume of glacial acetic acid and the whole was allowed to stand in tap water at room temperature for several hours longer. The solution was found to be bright, clear, and transparent with about the consistency of molasses. If kept at moderate temperature, it retains these characteristics for an indefinite period.

In a similar example, 5 grams of linters was treated with 90 cc. of the acid of 85 to 88% strength and 10 cc. of water. The subsequent steps were the same as in the preceding example. A similar solution was obtained but not quite so efficient in character so that for practical purposes the lower limit of acid strength is preferably not under 85° F.

In another example, 5 grams of linters was treated with a similar amount of phosphoric acid of 90% strength and kept for six hours at a temperature of from 47° to 50° F., after which it was left out of doors for a considerable time at a temperature ranging from below freezing to around 50° F. This also gave a thoroughly satisfactory solution. The temperatures are, therefore, seen to vary from below freezing to approximately 70° to 100° F., but to obtain the best results, its preferably desirable to keep the temperature nearer that of ice water. This facilitates the formation of a solution in less time than if a higher temperature is used and the character of the solution is more desirable.

As another example of the possibilities of this invention, 5 grams of linters was treated with 100 cc. of 90% phosphoric acid and allowed to stand in tap water until a solution was obtained. Then 50 cc. of ethyl alcohol was added. This gives a good smooth mixture. It is found that if the proportion of alcohol is increased, that a certain amount of precipitation is produced.

These examples show that a solution of cellulose can be obtained by treatment of phosphoric acid of proper strength alone or by treatment with phosphoric acid with a subsequent addition of acetic acid, preferably glacial acetic acid, or by the treatment with phosphoric acid and the subsequent addition of alcohol. The preferable temperature limits have been set forth in the examples given.

These solutions of cellulose may be used for any of the numerous uses for which other solutions have been previously employed. They may be appropriately treated for the purpose of forming cellulose esters or cellulose ethers or other organic derivatives of cellulose. The solutions may also be employed for spinning artificial silk instead of the various solutions herebefore used for this purpose. The solutions are preferable to those which have previously been formed with some other acids, such as sulphuric acid, since they do not attack metals in the cold so readily. The solution may also be used for the production of artificial horse hair, artificial ribbons, or films. Fabrics or articles made with cotton, wool, linen, silk, or artificial silk, may be impregnated or treated with this solution with the production of very desirable effects. In general it may be stated that the solution of cellulose formed as above described may be used for substantially any purpose for which previous cellulose esters, cellulose ethers, or other cellulose solutions have been used.

In the treatment with ascetic acid, particularly glacial ascetic acid, the process results in some acetylation forming cellulose acetate. Under certain temperature conditions and with relatively large amounts of acetic acid, the amount of cellulose acetate formed may be very substantial. Also where the subsequent treatment comprises the addition of alcohols, etherification may take place with the formation of cellulose ethers.

In view of the scope of the invention as indicated above, it is desired to state particularly that it is to be regarded as limited only by the scope of the appended claims.

We claim as our invention:

1. A process for obtaining a solution of cellulose which comprises mixing the same with phosphoric acid of from 75% to 100% strength and allowing the mixture to stand for several hours until the desired solution of the cellulose is effected at a temperature below 70° F.

2. A process for obtaining a solution of cellulose which comprises mixing the same with phosphoric acid of from 75% to 100% strength and allowing the mixture to stand for several hours until the desired solution of the cellulose is effected at a temperature of from 30° to 50° F.

3. A process for obtaining a cellulosic solution which comprises the steps of mixing cellulose with phosphoric acid, allowing the mixture to stand for several hours until the desired solution of the cellulose is effected by the phosphoric acid, and thereafter adding a substance having the formula $C_nH_{2n+1}R$ in which R represents OH or COOH and $n$ is at least 1.

4. In the process for obtaining a solution of cellulose, the step of mixing substantially 5 parts by weight of cotton linters with substantially 100 parts by volume of phosphoric acid of 85% to 90% strength and maintaining the mixture for several hours at a temperature below 50° F.

5. A process for obtaining a solution of cellulose which comprises mixing the same with phosphoric acid, allowing the mixture to stand for several hours until the desired solution of the cellulose is effected, and thereafter adding from 30% to 50% in volume of a substance having the formula $C_nH_{2n+1}R$, in which R stands for OH or COOH and $n$ is at least 1.

6. A process for obtaining a solution of cellulose which comprises mixing the same with phosphoric acid, allowing the mixture to stand for several hours until the desired solution of the cellulose is effected at from 30° to 50° F. and thereafter adding a substance having the formula $C_nH_{2n+1}R$, in which R stands for OH or COOH and $n$ is at least 1.

7. A process for obtaining a solution of cellulose which comprises mixing the same with phosphoric acid of from 75% to 100% strength, allowing the mixture to stand for several hours until the desired solution of the cellulose is effected at a moderately cool temperature, thereafter adding a substance having the formula $C_nH_{2n+1}R$, in which R stands for OH or COOH and allowing to stand several hours longer and $n$ is at least 1.

8. A process for obtaining a solution of cellulose which comprises mixing the same with phosphoric acid of from 75% to 100% strength, allowing the mixture to stand for several hours until the desired solution of the cellulose is effected at a temperature of from 30° to 50° F., thereafter adding a substance having the formula $C_nH_{2n+1}R$, in which R stands for OH or COOH, and allowing the mixture to stand for several hours longer and $n$ is at least 1.

9. A process for obtaining a solution of cellulose which comprises mixing the same with phosphoric acid, allowing the mixture to stand for several hours until the desired solution of the cellulose is effected, and thereafter adding acetic acid.

10. A process for obtaining a solution of cellulose which comprises mixing the same with phosphoric acid of from 75% to 100% strength, allowing the same to stand for several hours until the desired solution of the cellulose is effected, and thereafter adding glacial acetic acid.

11. A process for obtaining a solution of cellulose which comprises mixing the same with phosphoric acid of from 75% to 100% strength, thereafter adding glacial acetic acid, and allowing the mixture to stand.

12. In the process for obtaining a solution of cellulose, the steps of mixing substantially 5 parts by weight of cotton linters with substantially 100 parts by volume of phosphoric acid of 85% to 90% strength, maintaining the mixture for several hours at a temperature below 50° F., and then adding ⅓ the volume of acetic acid thereto.

13. As a new product, a solution of cellulose in phosphoric acid and a substance having the formula $C_nH_{2n+1}R$, in which R stands for OH or COOH and $n$ is at least 1.

14. As a new product, a solution of cellulose in phosphoric acid and glacial acetic acid.

In testimony whereof, we have hereunto subscribed our names.

GEORGE W. MILES.
CAMILLE DREYFUS.